No. 897,905. PATENTED SEPT. 8, 1908.
E. S. KINKADE.
HARROW.
APPLICATION FILED DEC. 14, 1907.
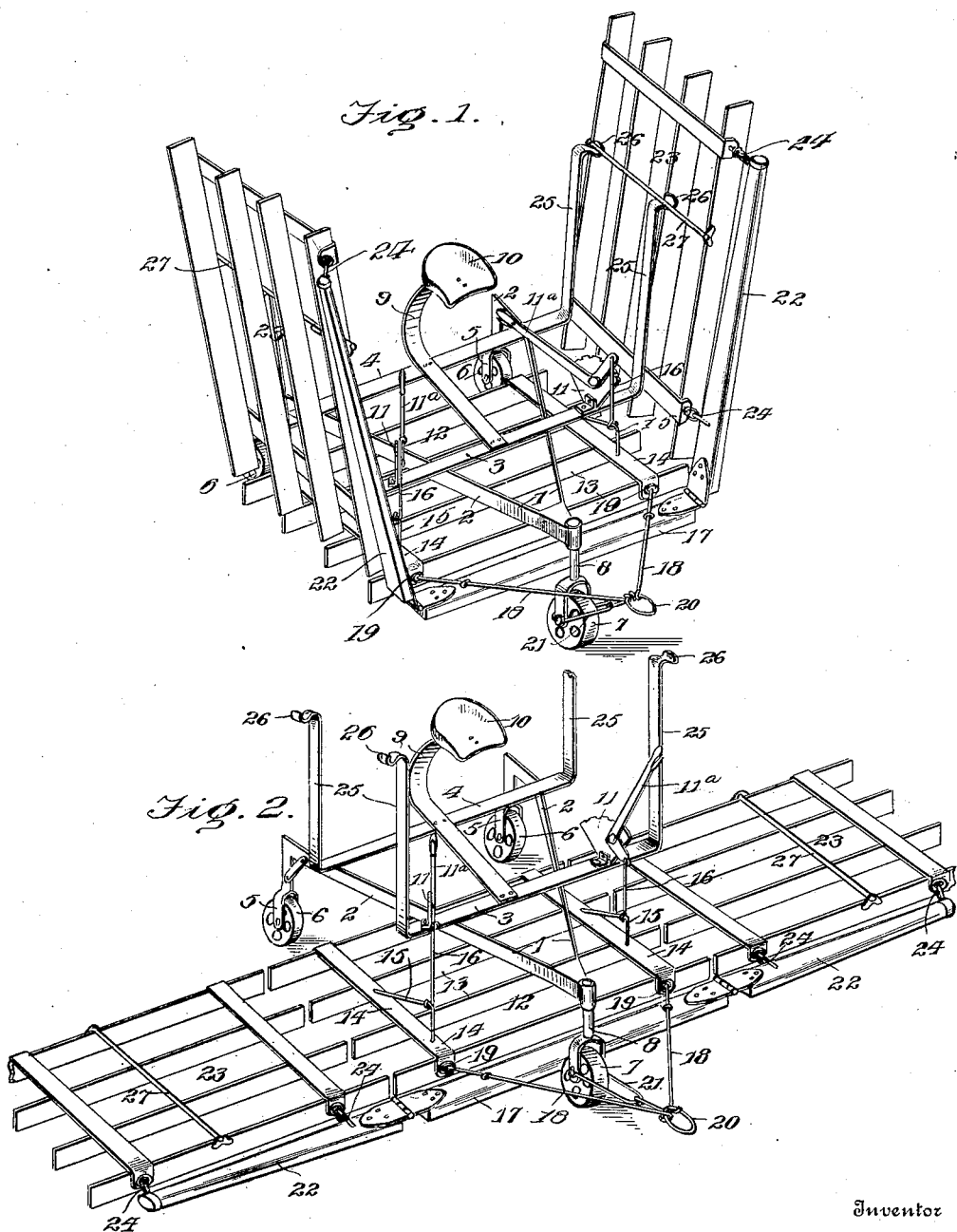
Inventor
E. S. Kinkade.
Witnesses
By
Attorneys

UNITED STATES PATENT OFFICE.

ELISHA S. KINKADE, OF GENEVA, NEBRASKA.

HARROW.

No. 897,905.

Specification of Letters Patent.

Patented Sept. 8, 1908.

Application filed December 14, 1907. Serial No. 406,521.

*To all whom it may concern:*

Be it known that I, ELISHA S. KINKADE, a citizen of the United States, residing at Geneva, in the county of Fillmore and State of Nebraska, have invented certain new and useful Improvements in Harrows, of which the following is a specification.

This invention contemplates certain new and useful improvements in agricultural implements and the object of the invention is an improved construction of wheel or riding harrow which is adapted to be used to break up clods and also for leveling purposes and the like.

A further object of the invention is an improved implement of this character, the central harrow portion of which is provided with side portions, pivotally connected thereto and adapted to be raised and held in raised position when desired by peculiar means hereinafter described.

With this and other objects in view as will more fully appear as the description proceeds, the invention consists in certain constructions and arrangements of parts that I shall hereinafter fully describe and claim.

For a full understanding of the invention and the merits thereof, reference is to be had to the following description and accompanying drawing, in which:

Figure 1 is a perspective view of my improved harrow showing the central harrow portion elevated and the side harrow portions held in raised position, and Fig. 2 is a similar view thereof showing the harrow portions lowered into operative position.

Corresponding and like parts are referred to in the following description and indicated in all the views of the drawing by the same reference characters.

The supporting frame 1 of my improved harrow comprises forwardly converging side-bars 2 and front and rear cross bars 3 and 4 connected together in any desired manner.
To the rear ends of the longitudinal bars 2 forked standards 5 are connected, rear traveling-wheels 6 being journaled in the respective standards. A front traveling-wheel 7 of the caster type has its spindle 8 mounted in a bearing at the juncture of the two forward ends of the bars 2 to support the frame at the front. A bar 9 is secured to the said cross-bars and is curved upwardly at its rear end to form a support for a driver's seat 10.

Two quadrants 11 are mounted on the cross-bar 3 near the ends thereof and two bell crank hand levers 11$^a$ are fulcrumed to the respective quadrants 11, said hand levers being provided with detents whereby they may be held in any desired position.

The middle harrow portion 12 is suspended from the frame 1 and comprises a series of vertically disposed and transversely extending clod-breaking and leveling blades 13 which are parallel to each other and extend beneath the frame. These blades 13 are held in position by two longitudinal beams 14 secured near each end of the blades, said beams being each provided with a bail 15 which is connected by a link 16 to one end of the corresponding bell crank lever 11$^a$. By raising or lowering the free ends of such levers, the driver can elevate the central harrow portion from operative position or permit it to drag over the ground, as desired. A main or intermediate section 17 of a draft bar extends across the front of the middle harrow portion 12 contiguous to the forward blade thereof, said section being attached to two hounds 18 secured at one end to eyes 19 provided near the opposite ends of the said forward blade. The other ends of said hounds are secured to a ring 20 which is also attached by chain or wire connections 21 to the respective ends of the horizontal axis of the caster-wheel 7. The draft-bar section 17 is connected at each end to hinged draft-bar sections 22, so as to permit the latter to swing about horizontal axes.

Side harrow portions 23 are mounted on opposite sides of the central harrow portion 12 and are constructed substantially similar thereto, with the exception that there are no bails provided on the beams 14. These side harrow portions are connected to the hinged sections 22 of the draft-bar, through the instrumentality of a series of interlocking eyes 24 secured in said sections and the forward blades of the side portions. The side portions 23 are adapted, by their connection with the pivoted sections of the draft-bar, to be raised in a substantially vertical position as may be desired to facilitate the passage of the implement through a farm gate or the like.

In order to maintain the side portions 23 of the harrow in raised position, I have provided posts or standards 25 projecting upwardly from the frame 1 and in the present instance formed by extending or bending upwardly the extended ends of the front and rear cross-bars 3 and 4. Preferably these standards are formed with outwardly projecting hook extremities 26 designed to engage the rods 27 secured to the side portions 23 near the outer ends thereof.

The draft is designed to be applied to the ring 20 and is exerted directly on the frame 1 by means of the connections 21 to the caster-wheel thereof and on the central harrow portion through the instrumentality of the hounds 18. Since the hounds are also attached to the draft-bar 17, the draft is indirectly exerted on the side harrow portions which are connected to the hinged sections of the said draft-bar.

From the above description in connection with the accompanying drawing, it will be seen that I have provided a simple, durable and efficient construction of wheel harrow in the practical operation of which the blades of the harrow portion are dragged over the ground and serve to level the latter by removing earth from the hillocks and by depositing it in the depressions, said blades also serving to break up any clods over which the implement passes.

It is to be understood that if desired, the wheel frame may be constructed so that it may be widened or lengthened to adapt it for use with any size harrow portion. And it is also to be understood that I may provide two caster-wheels at the front of the frame instead of one as hereinbefore described.

Although my improved harrow is illustrated in the accompanying drawing as devoid of teeth, it is to be understood that it is within the scope of the invention to provide teeth, disks, plows, shovels or the like, on the blades 13.

Having thus described the invention, what I claim is:

A harrow comprising a wheeled frame embodying longitudinal bars and cross bars secured thereto and bracing the same, the ends of the cross bars being extended upwardly to form standards and being formed at their upper extremities with upwardly facing hooks, a middle harrow portion suspended from the frame, and vertically swinging side harrow portions having longitudinal rods arranged for engagement with the hooked extremities of the standard to support the side harrow portions in raised position.

In testimony whereof I affix my signature in presence of two witnesses.

ELISHA S. KINKADE. [L. S.]

Witnesses:
 A. D. CURTISS,
 H. S. PAGE.